(12) United States Patent
Le Scouarnec et al.

(10) Patent No.: US 11,438,503 B2
(45) Date of Patent: *Sep. 6, 2022

(54) PLENOPTIC SUB APERTURE VIEW SHUFFLING WITH IMPROVED RESOLUTION

(71) Applicant: INTERDIGITAL CE PATENT HOLDINGS, Paris (FR)

(72) Inventors: Nicolas Le Scouarnec, Liffre (FR); Arno Schubert, Cesson-Sevigne (FR); Valter Drazic, Cesson-Sevigne (FR)

(73) Assignee: InterDigital CE Patent Holdings, Inc., Paris (FR)

( * ) Notice: Subject to any disclaimer, the term of this patent is extended or adjusted under 35 U.S.C. 154(b) by 204 days.

This patent is subject to a terminal disclaimer.

(21) Appl. No.: 17/062,806

(22) Filed: Oct. 5, 2020

(65) Prior Publication Data

US 2021/0021758 A1 Jan. 21, 2021

Related U.S. Application Data

(63) Continuation of application No. 16/314,581, filed as application No. PCT/EP2017/065914 on Jun. 27, 2017, now Pat. No. 10,834,313.

(30) Foreign Application Priority Data

Jun. 30, 2016 (EP) .................................... 16305821

(51) Int. Cl.
*G06K 9/32* (2006.01)
*H04N 5/232* (2006.01)
(Continued)

(52) U.S. Cl.
CPC .......... *H04N 5/23232* (2013.01); *G06T 3/40* (2013.01); *G06T 5/50* (2013.01); *H04N 5/22541* (2018.08);
(Continued)

(58) Field of Classification Search
None
See application file for complete search history.

(56) References Cited

U.S. PATENT DOCUMENTS

| | | | |
|---|---|---|---|
| 4,394,069 A * | 7/1983 | Kaye | .................. G02F 1/13473 349/77 |
| 5,369,266 A | 11/1994 | Nohda et al. | |

(Continued)

FOREIGN PATENT DOCUMENTS

| | | |
|---|---|---|
| CN | 102906616 A | 1/2013 |
| JP | H08250692 A | 9/1996 |

(Continued)

OTHER PUBLICATIONS

Wetzstein et al., "Computational plenoptic imaging." In Computer Graphics Forum, vol. 30, No. 8, pp. 2397-2426. Oxford, UK: Blackwell Publishing Ltd, 2011. (Year: 2011).*

(Continued)

*Primary Examiner* — Feng Niu
(74) *Attorney, Agent, or Firm* — Condo Roccia Koptiw LLP

(57) ABSTRACT

A system and method for generating high resolution images using a plenoptic camera, is provided. In one embodiment, the comprises capturing a first set of images in a first unexcited state of operation by using a birefringent medium disposed between a main lens and an array of lenses having a plurality of apertures. Each pixel of the first set of images is then mapped to a first set of apertures. The first unexcited state is then caused to become a second excited state by applying a voltage across said birefringent medium. A second set of images are captured in the second excited state and a second set of pixels of the second image is mapped to a second set of apertures. A value is calculated for each first and second set of images and the value associated with said (Continued)

first set of images is subtracted from at least two times the value calculated from said second set of image.

19 Claims, 4 Drawing Sheets

(51) Int. Cl.
| | |
|---|---|
| *H04N 9/07* | (2006.01) |
| *H04N 13/232* | (2018.01) |
| *H04N 13/296* | (2018.01) |
| *H04N 5/225* | (2006.01) |
| *G06T 3/40* | (2006.01) |
| *G06T 5/50* | (2006.01) |

(52) U.S. Cl.
CPC ............. *H04N 9/07* (2013.01); *H04N 13/232* (2018.05); *H04N 13/296* (2018.05); *G06T 2207/10052* (2013.01); *G06T 2207/20224* (2013.01)

(56) References Cited

U.S. PATENT DOCUMENTS

| | | | |
|---|---|---|---|
| 8,514,491 B2 | 8/2013 | Duparre | |
| 8,582,015 B2 | 11/2013 | Katsuda et al. | |
| 9,137,524 B2* | 9/2015 | Maciocci | H04N 13/383 |
| 9,293,491 B2 | 3/2016 | Kanamori et al. | |
| 9,310,302 B2* | 4/2016 | Garsha | G01N 21/6456 |
| 9,557,856 B2 | 1/2017 | Send et al. | |
| 10,012,532 B2 | 7/2018 | Send et al. | |
| 10,048,130 B2 | 8/2018 | Lambert et al. | |
| 10,085,005 B2* | 9/2018 | Pitts | H04N 13/282 |
| 10,297,703 B2* | 5/2019 | Tian | H01L 27/14647 |
| 10,531,071 B2* | 1/2020 | Cole | H04N 13/282 |
| 10,746,600 B2* | 8/2020 | Lambert | G01J 3/2823 |
| 2003/0090597 A1* | 5/2003 | Katoh | H04N 9/3111 |
| | | | 348/E9.027 |
| 2004/0085486 A1* | 5/2004 | Katoh | H04N 9/3108 |
| | | | 349/196 |
| 2009/0185801 A1 | 7/2009 | Georgiev et al. | |
| 2010/0309329 A1 | 12/2010 | Hiramoto et al. | |
| 2011/0001866 A1 | 1/2011 | Katsuda et al. | |
| 2011/0129165 A1 | 6/2011 | Lim et al. | |
| 2011/0169994 A1* | 7/2011 | DiFrancesco | G02B 13/16 |
| | | | 348/340 |
| 2012/0026297 A1 | 2/2012 | Sato | |
| 2012/0105690 A1 | 5/2012 | Waqas et al. | |
| 2012/0200694 A1* | 8/2012 | Garsha | G01N 21/6456 |
| | | | 382/128 |
| 2013/0270421 A1 | 10/2013 | Kanamori et al. | |
| 2014/0078259 A1 | 3/2014 | Hiramoto et al. | |
| 2014/0146148 A1* | 5/2014 | Maciocci | G06F 3/013 |
| | | | 348/59 |
| 2014/0192237 A1 | 7/2014 | Ikedo | |
| 2015/0256744 A1 | 9/2015 | Namboodiri et al. | |
| 2015/0286340 A1* | 10/2015 | Send | G01B 11/25 |
| | | | 250/206.1 |
| 2016/0202124 A1* | 7/2016 | Lambert | G01J 3/2823 |
| | | | 356/301 |
| 2016/0212409 A1* | 7/2016 | Cole | H04N 13/243 |
| 2016/0307372 A1* | 10/2016 | Pitts | H04N 13/117 |
| 2018/0294376 A1* | 10/2018 | Tian | H01L 27/14603 |
| 2018/0328786 A1 | 11/2018 | Lambert | |
| 2019/0064493 A1* | 2/2019 | Truong | G06T 7/557 |

FOREIGN PATENT DOCUMENTS

| | | |
|---|---|---|
| JP | H09130818 A | 5/1997 |
| JP | 2008167154 A | 7/2008 |
| JP | 2010239290 A | 10/2010 |
| JP | 2012042859 A | 3/2012 |
| KR | 20110059247 A | 6/2011 |
| KR | 20110059686 A | 6/2011 |
| KR | 20140061234 A | 5/2014 |
| RU | 2570349 C1 | 12/2015 |
| WO | WO 2013080899 A1 | 6/2013 |

OTHER PUBLICATIONS

Marwah et al., "Compressive Light Field Photography Using Overcomplete Dictionaries and Optimized Projections." ACM Transactions on Graphics 32, No. 4 (Jul. 1, 2013): 1. (Year: 2013).*
Duparré et al., "Optical Challenges in Super-Resolving Array Cameras." In Imaging Systems and Applications, pp. IM4C-2. Optical Society of America, 2014. (Year: 2014).*
JPH08250692A TR EN Machine Apr. 6, 2021.
JP2012042859A TR EN machine Apr. 6, 2021.
JP2008167154A TR EN Apr. 6, 2021.
Lei et al, "An electrically tunable plenoptic camera using a liquid crystal microlens array," Review of scientific instruments 86, No. 5, May 15, 2015.
EP Search Report for EP16305821 dated Dec. 5, 2015.
ISR for PCT/EP2017/065914 dated Sep. 6, 2017.

* cited by examiner

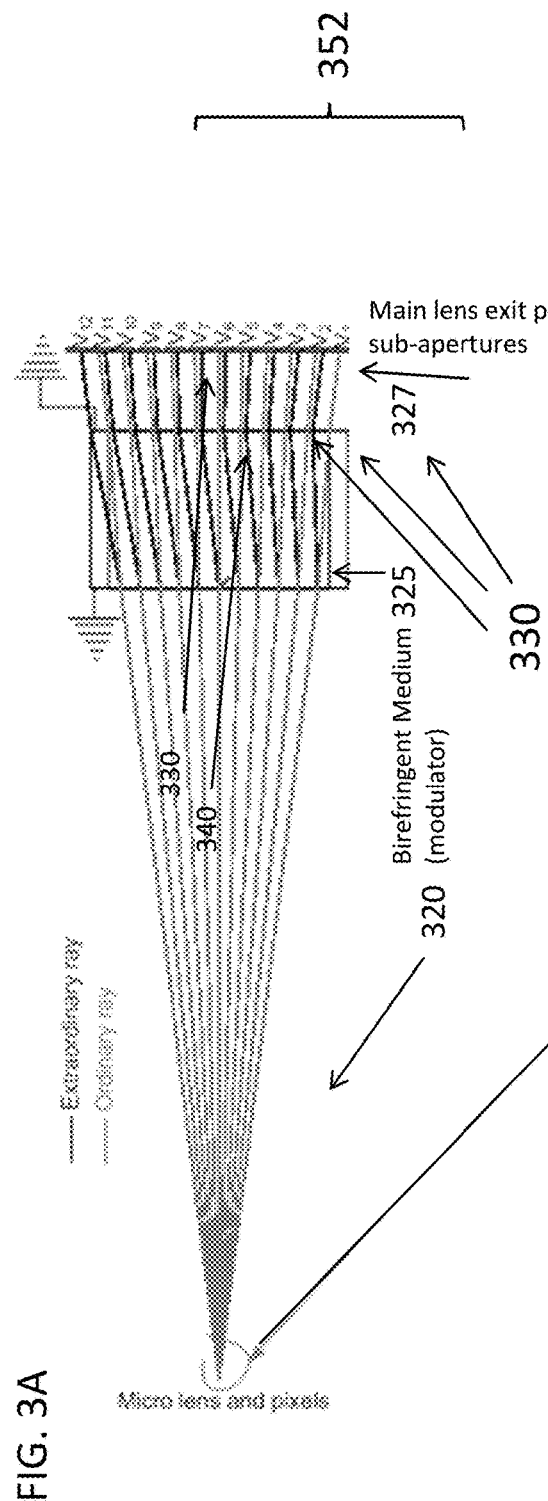
FIG. 3A
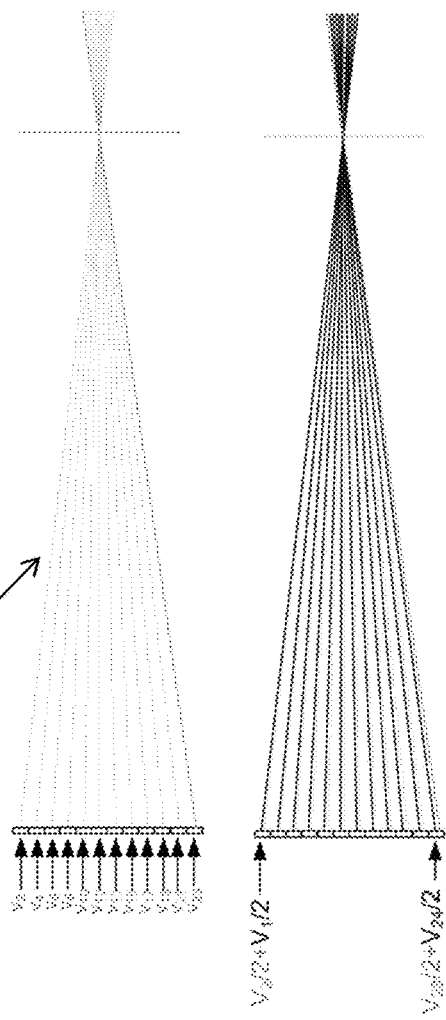
FIG. 3B
FIG. 3C

PLENOPTIC SUB APERTURE VIEW SHUFFLING WITH IMPROVED RESOLUTION

CROSS-REFERENCE

This application is a continuation of U.S. patent application Ser. No. 16/314,581, filed Dec. 31, 2018, which is a 371 of International Patent Application No. PCT/EP2017/065914, filed Jun. 27, 2017, which claims the benefit of European Patent Application No. 16305821, filed Jun. 30, 2016, which is incorporated by reference herein in its entirety.

TECHNICAL FIELD

The present disclosure relates generally to digital image processing and more particularly to plenoptic imaging techniques using demosaicing.

BACKGROUND

This section is intended to introduce the reader to various aspects of art, which may be related to various aspects of the present invention that are described and/or claimed below. This discussion is believed to be helpful in providing the reader with background information to facilitate a better understanding. Accordingly, it should be understood that these statements are to be read in this light, and not as admissions of prior art.

Photography creates durable images by recording light or other electromagnetic radiation. Images are captured electronically by means of an image sensor or chemically by means of a light-sensitive material. In regular cameras, a lens is used to focus the light reflected or emitted from objects into a real image on the light-sensitive surface, inside a camera during a timed exposure. With an electronic image sensor, an electrical charge is produced at each pixel, which is then processed and stored in a digital image file for further use. In classic photography, the focal surface is approximately a plane or focal plane. The focal surface is perpendicular to the optical axis of the camera and the depth of field is constant along the plane. By contrast, in a plenoptic camera, each micro-image depicts an area of the captured scene and each pixel associated with that micro-image shows this certain area from the point of view of a certain sub-aperture location on the main lens exit pupil. The raw image of the scene is then obtained as a result of the sum of all the micro-images and the raw image contains the angular information of the light-field. Consequently, neighbor pixels in a raw image contain different angular information as each pixel corresponds to a different view.

A plenoptic camera uses a micro lens array that is positioned in the image plane of a main lens and before an array of photo sensors onto which one micro-image (also called sub-image) is projected. By placing a micro lens array between the main lens and the sensor, a plenoptic camera captures the direction of the light bundles that enter the camera, in addition to their position, intensity and color. Captured data is then demultiplexed to provide a matrix of horizontally and vertically aligned views from slightly different points of view over the scene. Consequently, each micro-image depicts an area of the captured scene and each pixel associated with that micro-image shows this certain area from the point of view of a certain sub-aperture location on the main lens exit pupil. The raw image of the scene is then obtained as a result of the sum of all the micro-images acquired from respective portions of the photo-sensors array.

The recent release of hand held plenoptic cameras have introduced the potential of light field imaging to the mass market. This new capability have suddenly increased the interest in introducing a number of light fields applications. Some popular applications have included those that concentrate on depth estimation or post-capture refocusing. Raw data conversion is complex and involve several issues that need to be resolved. One such issue involves issues with providing superior resolution. Consequently, there is a need for improved techniques that can provide better image resolution of using captured raw data.

SUMMARY

Additional features and advantages are realized through the techniques of the present disclosure. Other embodiments and aspects of the invention are described in detail herein and are considered a part of the claimed invention. For a better understanding of the invention with advantages and features, refer to the description and to the drawings.

A system and method for generating high resolution images using a plenoptic camera, is provided. In one embodiment, the comprises capturing a first set of images in a first unexcited state of operation by using a birefringent medium disposed between a main lens and an array of lenses having a plurality of apertures. Each pixel of the first set of images is then mapped to a first set of apertures. The first unexcited state is then caused to become a second excited state by applying a voltage across said birefringent medium. A second set of images are captured in the second excited state and a second set of pixels of the second image is mapped to a second set of apertures. A value is calculated for each first and second set of images and the value associated with said first set of images is subtracted from at least two times the value calculated from said second set of image.

BRIEF DESCRIPTION OF THE DRAWINGS

The present disclosure will be better understood and illustrated by means of the following embodiment and execution examples, in no way limitative, with reference to the appended figures on which:

FIG. 3A is a depiction of a diagram for a sub-aperture to pixel mapping of both ordinary and extraordinary states according to one embodiment;

FIG. 3B is an illustration of a zoomed image, providing a more detailed pixel mapping of ordinary state as provided by the embodiment shown in FIG. 3A; and FIG. 3C is an illustration of a zoomed image, providing a more detailed pixel mapping of ordinary state as provided by the embodiment shown in FIG. 3A

In FIGS. 1-4, the represented figures provide examples that are purely functional entities and do not necessarily correspond to physically separate entities. Namely, they could be developed in the form of software, hardware, or be implemented in one or several integrated circuits, comprising one or more processors.

Wherever possible, the same reference numerals will be used throughout the figures to refer to the same or like parts.

DESCRIPTION

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modification.

Figure 1:
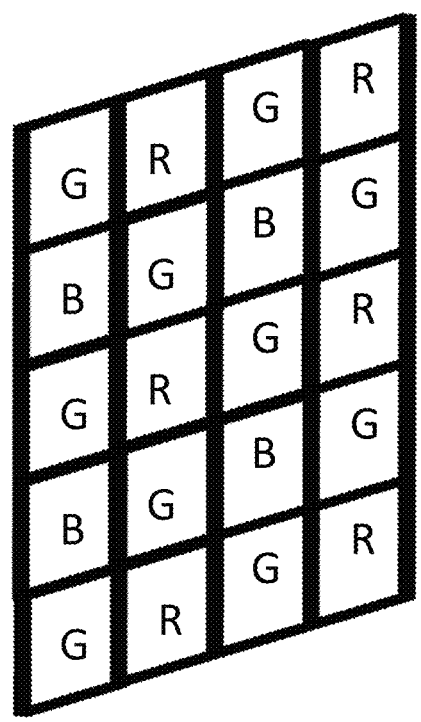
FIG. 1 is a block diagram showing a color filter array (CFA) used in a demosaicing process.

FIG. 1, is prior art depiction of a plenoptic micro-image matrix using a color filter array (CFA) used in a demosaicing process. Demosaicing, as known by those skilled in the art, is a technique for processing digital images by reconstructing incomplete color sample output from an image sensor overlaid with a filter such as CFA used in FIG. 1. Color filter arrays are used in demosaicing processes are digital image processing techniques that use a color filter array to reconstruct a full color image from incomplete color samples. The color samples are often an output of one or more image sensors overlaid with a CFA. A color filter array is a mosaic of color filters in front of one or more image sensors. Commercially, the most commonly used CFA configuration is the Bayer filter. The prior art example of FIG. 1 provides an example of such a filter. As shown, the alternating red (R) and green (G) filters for odd rows, are further alternated in even rows with intervening rows that include interspersed green (G) and blue (B) filters. This is because the Bayer pattern is a periodic pattern with a period of two different color pixels in each dimension (vertical and horizontal). In the horizontal direction, a single period includes either a green pixel and a red pixel, or a blue pixel and a green pixel. In the vertical direction, a single period includes either a green pixel and a blue pixel, or a red pixel and a green pixel.

The final result, such as in this example, there are twice as many green filters as red or blue ones, catering to the human eye's higher sensitivity to green light. The color sub-sampling of a CFA by its nature results in aliasing, and therefore optical anti-aliasing filters are placed in the optical path between the image sensor and the lens to reduce the false color artifacts (chromatic aliases) introduced by interpolation. Since each pixel of the sensor is behind a color filter, the output is an array of pixel values, each indicating a raw intensity of one of the three filter colors. The Bayer filter is an example of a CFA that uses a multivariate interpolation on a uniform grid. Thus, an algorithm is needed to estimate for each pixel the color levels for all color components, rather than a single component. Conventional demosaicing algorithm reconstruct a full color image from such spatially under sampled color channels output from the CFA or other filters.

Figure 2B:
FIG. 2B is an illustration of a demultiplex image captured using a color filter and a micro lens array.
Figure 2A:
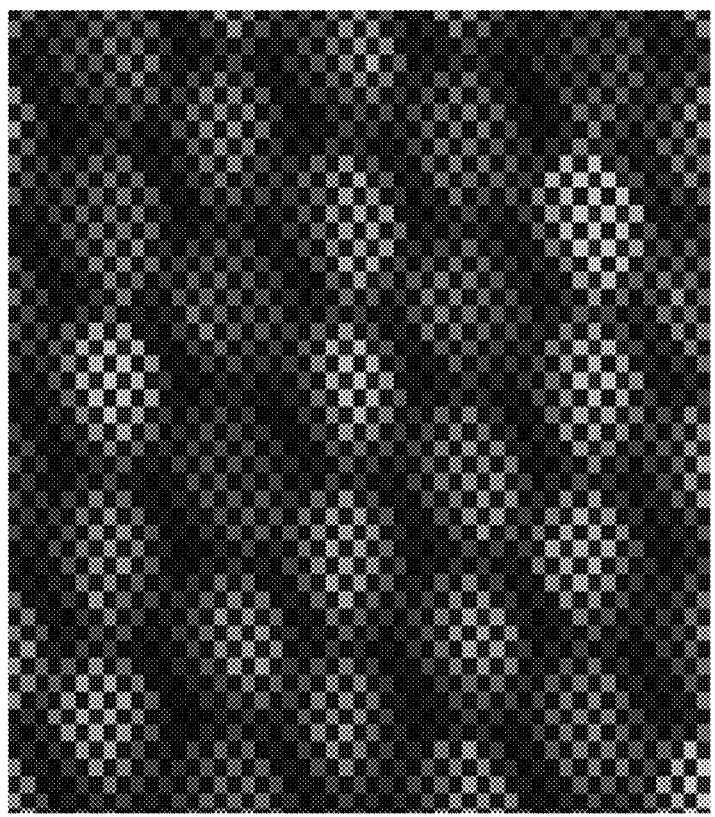
FIG. 2A is a depiction of plenoptic micro images captured with a color filter array (CFA) pattern.

The mathematical operations involved in such algorithms is simple as it is based on nearby instances of the same color component. The simplest method of such interpolation algorithm relies on the nearest-neighbor interpolation which simply copies an adjacent pixel of the same color channel. However, such filters are unsuitable for any application where details and quality of image are important. In addition, although these methods can obtain good results in homogenous image regions, they are prone to severe demosaicing artifacts in regions with edges and details when used with pure-color CFAs. More sophisticated demosaicing algorithms exploit the spatial and/or spectral correlation of pixels within a color image but they are still problematic as will be seen in more details by referring to FIG. 2B. FIG. 2A is an exemplary embodiment illustrating micro-images captured by a plenoptic camera. Each pixel is illuminated by a sub-aperture of the exit pupil of the main lens. Due to the sampling through multiple lens, once the sub-aperture views are demultiplexed, the final images can have low resolution when compared to traditional imaging systems. These techniques will be discussed in more detail in conjunction with FIGS. 3 and 4, this resolution can be greatly enhanced without requiring any additional sensors. In FIG. 2A, the lighter shade represents green (G) while the darkest shade represent blue (B) and the medium gray shade represent the color red (R). In this example, each pixel is illuminated by a sub-aperture of the exit pupil of the main lens.

Due to the hexagonal sampling, the residual rotation between the lens and pixel grids and to the CFA, once the sub-aperture views are demultiplexed, the ensuing views may have information or color missing from it in some areas. In order to recover the missing portions of the views or objects in a scene, it is possible to demosaic the raw data obtained by a plenoptic camera and then demultiplex to recover the views. The problem is that in most instances, this leads to color artifacts on the views. Consider a case where a neighbor pixels construction is used on a plenoptic raw image that contains different angular information (each pixel under a microlens corresponds to a different view). Demosaicing the raw plenoptic image in this case will potentially wrongly mixes angular information. In traditional algorithm that interpolate neighbor color values creating the so-called view cross-talk artifacts, this causes erroneous results Furthermore, it has been shown in that disparity estimation from views obtained from the demosaiced raw image is prone to even larger errors. FIG. 2B is an illustration of a demultiplex image as discussed. In the illustrated example of FIG. 2B, a scene is provided with views or images of one or more objects. The image was captured by a plenoptic camera. Looking at the view of FIG. 2B, it is difficult to recognize the image in the scene being presented. The overall contours an object is visible in FIG. 2B, but there are not sufficient information provided in the image to allow for detailed object recognition. Even in instances where shade, intensity and colors are not totally missing, the complementary color information has to be interpolated from distant pixels which are problematic in most instances. This affects the resolution greatly. In FIG. 2B, the demosaiced image is still missing information, but the image is demultiplexed in the appropriate manner. Without demosaicing, the raw data requires to be demultiplexed into views of the scene, without being demosaiced. Increasing the resolution requires using higher resolution sensors which use smaller "cells", leading to poorer performance in low light and higher noise. However, even if additional sensor cells of such quality are used, this technique will soon encounter limitations. The present technique as will be discussed in conjunction with FIGS. 3 and 4, will provide a way to increase optical resolution so that any of the original sensors that have adequate to good performance can still be used with improved final resolution quality In one embodiment a medium is used that with the application of a voltage turns into a birefringence medium. Birefringence is the property of crystalline material that gives rise to production of two refracted rays when a ray hits them. This property is due to non isotropic distribution of atoms in the media and happens in crystalline media whose crystalline mesh structure is strongly non isotropic. Quartz and Calcite are natural material which exhibit birefringence.

With those media, when a non polarized ray hits one of their surfaces which is at a special orientation, there are two rays that get created at refraction. One of these rays have one polarization characteristic and the other has a slightly different one. According to Snell-Descartes law: $n_i \sin\theta_i = n_r \sin\theta_r$, where $n_i$ and $n_r$ are the respective (and different) refractive indices of the incident and refracted medium and $\theta_i$ and $\theta_r$ are the incident and refracted angles.

Birefringent materials refract rays according to Snell's law but the effective index of refraction in the medial depends upon the input polarization state and the angle the refracted ray makes with respect to the crystal axis. In a birefringent materials, the two type of rays can be defined as ordinary and extraordinary. Ordinary rays are refracted according to the Snell's principle $n \sin\theta = n_O \sin\theta'$, where "O" indicates the ordinary index.

In a birefringent media, the ray that obeys the Snell-Descartes law is called the ordinary ray and the medium has one ordinary index of refraction $n_0$. The second ray that is created undergoes another refraction $n_e$, it propagates in a direction within the material which has the extraordinary index $n_e$ and is polarized perpendicularly to the ordinary ray. In the birefringent medium, two rays are created with different propagation directions.

For extraordinary rays, in birefringent cases, the refraction law provides that $n \sin\theta = n(\theta_w) \sin\theta'$, where the effective index of refraction in the birefringent materials is a function of the angle $\theta_w$. The angle $\theta_w$ is the angle between the crystal axis vector "a" and the refracted wave vector "k". Additionally, the ray vector "s", which is the vector pointing in the direction of energy propagation does not follow the wave vector "k", but makes small angles with respect to vector "k". In isotropic medial, vectors "k" and "s" are the same. Therefore, for most optical designs, vector "k" must be taken into consideration. In these cases, the angle $\theta_w$ is defined as:

$$\cos\theta_w = \hat{k} \cdot \hat{a}.$$

The effective index of refraction is defined by $$\left(\frac{1}{n(\theta_w)}\right)^2 = \left(\frac{\cos\theta_w}{n_o}\right)^2 + \left(\frac{\sin\theta_w}{n_e}\right)^2,$$

where $n_0$ is the ordinary and $n_e$ is the extraordinary index of refraction,

The angle $\alpha$ between $\hat{k}$ and $\hat{s}$ is defined by $$\cos\alpha = \hat{k} \cdot \hat{s},$$

where $$\tan\alpha = \frac{(n_e^2 - n_o^2)\tan\theta_w}{n_e^2 + (n_o\tan\theta_w)^2},$$

and the vectors $\hat{k}$ and $\hat{s}$ are both coplanar with the crystal axis vector $\hat{a}$. The wave vector $\hat{k}$ points along the normal to the wavefront, while $\hat{s}$ points along the direction of energy propagation.

FIG. 3A illustrates a diagram for a sub-aperture to pixel mapping of both ordinary and extraordinary states. As shown, a plurality of rays (shown generally as 320) are passed through a medium shown by reference numerals 325. On the right hand side of the figure, there is the exit pupil of the main lens shown by reference numeral 327 generally. This main lens exit is further divided into sub apertures V1 to V12, as shown by reference numerals 352 collectively. In this embodiment, the medium 330 is electrically controllable. In one embodiment, a birefringent material is used but a variety of similar mediums are available as can be appreciated by those skilled in the art. In one example, to provide a birefringent medium one is used that incorporates twisted liquid crystals nematic (TN). The TN liquid crystal can be sandwiched between two glass plates having transparent Indium Tin Oxide (ITO) electrodes, in one embodiment. In one example, in its ground state, with no voltage applied to the TN cell, the sub-apertures are imaged each onto one sole pixel per micro image following the green lines which depicts the ordinary rays.

FIG. 3A shows one micro-lens and one column of the pixels show how the ordinary ray map each sensor pixel to two sub-aperture pixels (one corresponding to the ordinary ray, one corresponding to the extraordinary ray). To understand how things work with extraordinary rays, it is better to follow the blue rays (shown in darker shade) the other way round: from pixels to sub-apertures. When leaving one pixel, the extraordinary ray follows the blue path (dark gray in the Figure). It crosses the optical center of its microlens and then hits the birefringent cell 325. The cell is in its "extraordinary" state with an applied voltage and thus, this time, two rays are generated, the green which refracts as ordinary, and the blue one which refracts as the extraordinary ray. When both hit the exit pupil of the main lens, the ordinary ends up on one sub-aperture while the extraordinary ray maps into another sub-aperture. This means that if one begins from the exit pupil, in normal state, the ordinary ray of main sub-apertures (green v2-v12,v13-v23) will hit the sensor pixel and secondary sub-apertures are ignored dropped. In "extraordinary" state, a part of the light will come from the main sub-apertures (green or light gray in the Figures—as an ordinary ray) and another part of the light will come from the secondary sub-apertures (blue v1-v11-v14-v24). This allows to capture twice the resolution by reading the sensor with the modulator once in ordinary state and once in extraordinary state. Processing afterwards will recover the higher resolution image.

FIGS. 3B and 3C each provide a more detail illustration of area 310 of FIG. 3A. More specifically, FIG. 3B shows the ordinary (green-light gray) rays in more detail, while FIG. 3C shows the extraordinary (blue or dark gray) rays in more detail. In this way, sub-aperture to pixel mapping of ordinary (green) and extraordinary states (blue) of FIG. 3A become more obvious by looking at the details provided in FIGS. 3B and 3C.

In the ordinary state, the pixels v1 to v11 are read, and pixels in between (e.g., v1/2+v2/2 . . . v11/2+v12/2) (rays not shown) fall in between sub-apertures. Adding resolution information to a plenoptic image requires two images to be taken sequentially. A first image is taken at t0 with the cell in the ordinary state. The pixels on the sensor do record the following states:

P(t0,v2), P(t0,v4), P(t0,v6), . . . , P(t0,v12), P(t0,v13), P(t0,v15), P(t0,v17), . . . , P(t0,v23)

A second image is taken at t1 with the cell in its extraordinary state. Two rays of equal intensities are generated if there is no polarizing phenomenon in the scene:

P(t0,v1)/2+P(t0,v2)/2, P(t0,v3)/2+P(t0,v4)/2

Thus,

If the first image is subtracted from the two times the second shot for pixels that are not borderline: it is possible as per one embodiment to recover v1,v24 hence reading 24 values with a sensor that only has 12 pixels.

Applying this concept to the rest of the pixels, if two scene shots are produced at t0 and t1, from these a linear combination of pixel values can be obtained that allows for two times more resolution information than usually provided using conventional methods. In one example, the additional component used in this system is twisted nematic (TN) cell.

The additional component used in this system is TN cell. The Liquid Crystal can have a big difference in value between the ordinary $n_o$ and extraordinary $n_e$ indices of refraction. In some cases, a LC mixture named MLC-9200-100 as known to those skilled in the art, for example can have $n_e - n_0 > 0.2$ which is a very big difference. In some embodiments, however, this is needed in order to reduce the thickness of the cell. This thickness has to be adjusted to become compatible with a placement of the cell between the micro-lens array and the sensor, and therefore any size reduction may be helpful (even if by a few mm) in certain applications.

Figure 4:
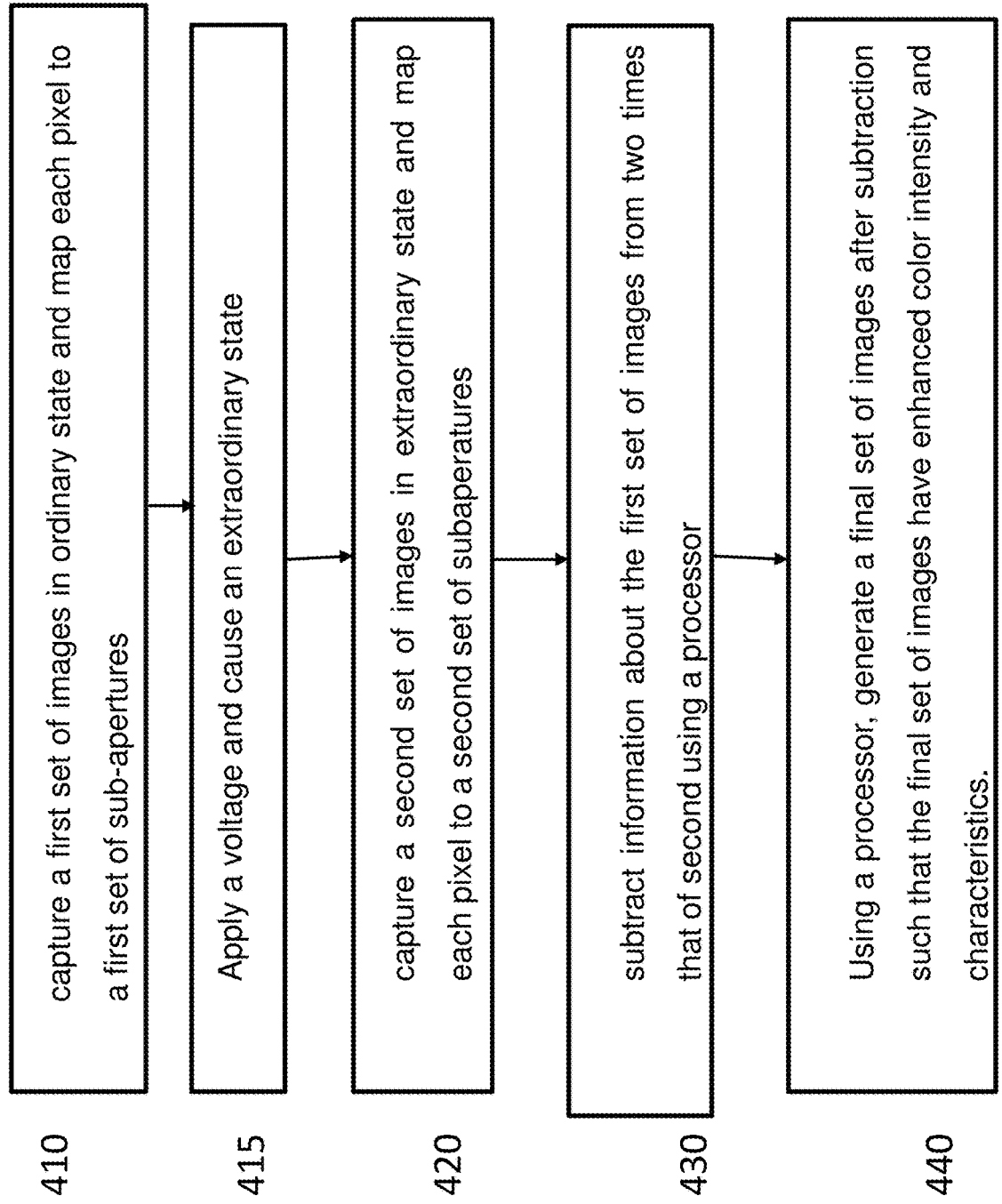
FIG. 4 is a flow chart depiction of the process in FIG. 3 according to one embodiment.

FIG. 4 is a flow chart depiction of the process explained above according to one embodiment. FIG. 4 illustrates the steps for a method of generating multiple images of different color intensity and characteristics using a plenoptic camera having a main lens disposed ahead of an array of lenses having a plurality of apertures. As shown in FIG. 4 at step 410, a first set of images are captured using a first state of an electro optical polarization modulator. In one embodiment, the modulator is disposed between said main lens and array of lenses with plurality of apertures. In step 420, a second set of images are captured using a second state of an electro optical polarization modulator. In step 430 the information about the second set of images is subtracted, such as for example with a configured processor, from information about the first set. In step 440, a final set of images are generated after the subtraction such that said final set of images have enhanced resolution. In one embodiment, a system for generating multiple images of different color intensity and characteristics can be used to conduct the method steps of FIG. 4 and the arrangement of FIGS. 3A and 3B. In this embodiment, a main lens (310) disposed in front of an array of lenses (352) associated with a plurality of apertures. An electrically controlled electro optical modulator (325) such as shown in FIG. 3A can be disposed between the micro lens and the array of lenses shown. The electro optical modulator functions between the two states (330 and 340 in FIG. 3A) upon application of an electrical voltage. The first set of images are then captured using the first state of an electro optical polarization modulator and a second set of images are also captured using a second state of an electro optical polarization modulator as discussed in conjunction with FIG. 4. Subsequently, a processor can be incorporated into the system that is configured to subtract information about said second set of images from information about the first set of captured images to generate (440 in FIG. 4) a final set of images with enhanced color intensity and characteristics. In this manner rich color information can be obtained, even in a very complicated situation, where a plenoptic camera delivers very sparse color information.

The invention claimed is:

1. A method comprising:
   capturing a first set of plenoptic data with an electrically controlled medium in a first state of excitement;
   capturing a second set of plenoptic data with the electrically controlled medium in a second state of excitement; and
   combining the first set of captured plenoptic data with the second set of captured plenoptic data.

2. The method of claim 1, wherein said electrically controlled medium is a birefringent medium.

3. The method of claim 1, further comprising generating a final set of images after combining the first set of captured plenoptic data with the second set of captured plenoptic data.

4. The method of claim 1, further comprising applying a voltage across the electrically controlled medium, wherein said application of voltage produces two simultaneous sets of rays.

5. A method comprising:
   capturing a first set of plenoptic data with a birefringent medium in a first state of excitement;
   capturing a second set of plenoptic data with the birefringent medium in a second state of excitement; and
   combining the first set of captured plenoptic data with the second set of captured plenoptic data.

6. The method of claim 5, further comprising:
   applying a voltage across the birefringent medium, wherein said application of voltage across said birefringent medium produces two simultaneous set of rays; and
   mapping the two sets of rays to different sets of apertures.

7. The method of claim 6, wherein said two sets of rays are green and blue, respectively, and some of the mapped apertures in the different sets of apertures are shared.

8. The method of claim 5, wherein said second state of excitement returns to said first state of excitement in the absence of an electrical voltage across said birefringent medium.

9. The method of claim 5, further comprising applying a voltage across the birefringent medium, wherein said application of voltage produces simultaneously a first set of rays and a second set of rays, and wherein said first set of rays and said second set of rays have different angles of refraction.

10. The method of claim 9, wherein said first set of rays and said second set of rays propagate in different directions.

11. The method of claim 9, wherein said first set of rays and said second set of rays have different indices of refraction.

12. The method of claim 9, wherein said first set of rays and said second set of rays have different propagation distances.

13. A plenoptic camera comprising:
   a processor configured to:
      capture a first set of plenoptic data with an electrically controlled medium in a first state of excitement;
      capture a second set of plenoptic data with the electrically controlled medium in a second state of excitement; and
   combine the first set of captured plenoptic data with the second set of captured plenoptic data.

14. The plenoptic camera of claim 13, wherein said electrically controlled medium is a birefringent medium.

15. The plenoptic camera of claim 14, wherein said birefringent medium switches between the first state of excitement and the second state of excitement upon application of an electrical voltage across said birefringent medium.

16. The plenoptic camera of claim 13, wherein said processor is further configured to generate a final set of images after combining said first set of captured plenoptic data with said second set of captured plenoptic data.

17. The plenoptic camera of claim 13, wherein said processor is further configured to apply a voltage across the electrically controlled medium, wherein said application of voltage produces simultaneously a first set of rays and a second set of rays.

18. The plenoptic camera of claim 17, wherein said first set of rays and said second set of rays have different indices of refraction.

19. The plenoptic camera of claim 17, wherein said first set of rays and said second set of rays have different propagation distances.

* * * * *